March 15, 1938. A. GAUDENZI 2,111,142
RECTIFIER SEAL
Filed May 4, 1934
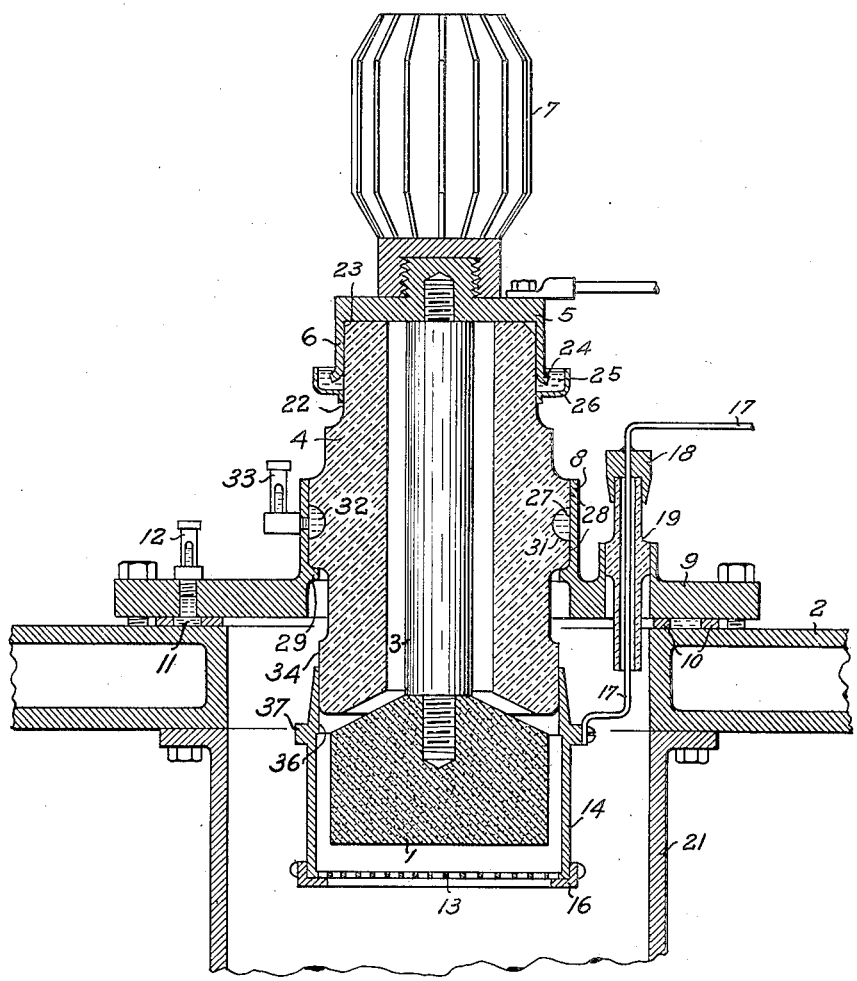
Inventor
A. Gaudenzi
by
Attorney Patented Mar. 15, 1938

2,111,142

UNITED STATES PATENT OFFICE 2,111,142

RECTIFIER SEAL

Arthur Gaudenzi, Baden, Switzerland, assignor to Aktiengesellschaft Brown Boveri & Cie., Baden. Switzerland, a joint-stock company of Switzerland Application May 4, 1934, Serial No. 723,900
In Germany May 24, 1933

13 Claims. (Cl. 250—27.5)

This invention relates in general to improvements in gas tight seals and more particularly to means for joining a body of material of vitreous character with a metallic member in gas tight relation.

Metal members are frequently supported in members of vitreous character in gas tight relation therewith, particularly in electrical apparatus in which a conductor penetrates the wall of a container within which the space is filled with gas or vapor other than air and either at atmospheric pressure or highly evacuated. Whether the conductor penetrates through a wall of vitreous material or is supported in a wall of metallic material through a bushing of vitreous material, the joints are generally sealed by processes involving fusion, or by interposition of packing of various nature. Fused seals are usually difficult to obtain particularly when the members to be sealed are of large diameter, and such seals cannot be disassembled without destruction thereof. Mechanical packed seals on the other hand are usually complicated and therefore expensive. By suitably arranging and proportioning the members to be sealed and by following a suitable method of assembling such members, a mechanical seal can be obtained by direct contact between the conductor and the vitreous wall or insulator, thereby avoiding the complication of packings and the difficulty of fused seals.

It is, therefore, one of the objects of the present invention to provide a gas tight mechanical seal between a metallic member and a member of vitreous character in which the sealing action is obtained by direct contact between the members to be sealed.

Another object of the present invention is to provide a gas tight mechanical seal between a metallic member and a member of vitreous character by maintaining the members to be sealed in a mechanically stressed condition.

Another object of the present invention is to provide a gas tight mechanical seal between a metallic member and a member of vitreous character in which the members to be sealed are assembled by pressing or shrinking.

Another object of the present invention is to provide a gas tight mechanical seal between a metallic member and a member of vitreous character in which the sealing action is aided by the use of a plastic sealing medium.

Objects and advantages other than those above set forth will be apparent from the following description when read in connection with the accompanying drawing which diagrammatically illustrates, in cross sectional elevation, several embodiments of the present invention applied to the sealing of an electrode of an electron discharge device in gas tight relation with the wall of the device.

Referring more particularly to the drawing by characters of reference, reference numeral 1 designates an anode electrode of an electron discharge device of any type known in the art and made of any suitable material. Anode 1 is to be supported in insulated and in gas tight relation in the wall 2 of the device. Wall 2 is herein shown as made of metallic material and as being provided with passages for the flow of cooling fluid therethrough, but it will be understood that such wall may also be made of material of vitreous character such as glass or porcelain. Anode 1 is fastened in any suitable manner, such as by screwing, on a stem 3 penetrating through an aperture in wall 2 and supported therethrough by means of an insulator bushing 4 of suitable material, preferably of heat resisting gas tight material of vitreous character such as glass or porcelain. Stem 3 is supported in spaced relation within insulator 4 through the agency of a cap 5 of suitable metal or composition of metals fastened to stem 3 by any suitable method such as by screwing and having a cylindrical portion 6 to be sealed against insulator 4 in gas tight relation as will be described hereinafter. Cap 5 constitutes the terminal for anode 1 and receives the connection with the circuit associated with the anode, and may also receive suitable means for dissipating any heat conducted from anode 1 through stem 3 to cap 5, such as a radiator 7 screwed thereon.

Insulator 4 may be directly supported on wall 2 and sealed thereagainst, but is preferably assembled in the cylindrical shell portion 8 of a flange 9 made of suitable metal or composition of metals fastened on wall 2 and sealed thereagainst by any well known means such as packing 10 confining a body of fluid sealing medium 11 such as mercury. The presence of the sealing medium may be continuously indicated by means of a gauge glass 12 fastened on flange 9. Such seals between two metallic members are of comparatively simple construction and therefore do not add any objectionable complication to the structure.

Anode 1 may be provided with an associated control electrode of suitable construction comprising for example a perforated plate 13 of conductive material such as iron or graphite supported in a metallic cylinder 14 by means of a ring 16 screwed to cylinder 14. Cylinder 14 may also be fastened on insulator 4 in the manner taught by the present invention although such connection need not be of a gas tight nature. The control electrode is connected with the circuits associated therewith through a conductor 17 penetrating through and welded to a cap 18 supported in gas tight relation on an insulator 19 likewise supported in gas tight relation in flange 9. Anode 1 and the space adjacent such anode may be confined within an arc guide 21 which may be supported on wall 2 as is well known in the art.

All the seals provided between metallic and insulating members in the figure may be of identical construction, such seals being shown as of different designs in order to illustrate a few embodiments of the invention. For the purpose of joining the cylindrical portion 6 of cap 5 with insulator 4, the upper outer surface of insulator 4 is ground to provide an outer cylindrical surface having a predetermined diameter when the insulator is mechanically free or in unstressed condition. It is well known that materials of vitreous character can be ground to obtain surfaces having the same degree of perfection as metallic surfaces with regard to accuracy and finish, so that the surface of cylindrical portion 22 may be given any degree of perfection desired. The cylindrical shell portion 6 of cap 5 is machined to form a cylindrical inner surface 23 having a suitable degree of accuracy and finish and having a diameter, when such shell is in the mechanically unstressed condition, which is smaller than the diameter of cylindrical portion 22.

Cap 5 and insulator 4 thus prepared for assembly are in frictional engagement. When such engagement is effected at room temperature the members must be urged into engagement under a suitable pressure. If cap 5 is made of metal or composition of metal having an appreciable positive thermal coefficient of expansion the cap may be heated to a temperature at which cylinder 6 is expanded to a diameter greater than the diameter of cylindrical portion 22, whereupon the members may be engaged without exerting appreciable pressure. Such engagement may also be effected by lowering the temperature of insulator 4 to a temperature at which the diameter of cylindrical portion 22 becomes smaller than the diameter of cylinder 6. Regardless of the method of assembling the members, upon completion of such assembly insulator 4, which acts as a core for shell 6, is maintained stressed in compression and shell 6 is maintained stressed in tension. It is well known, however, that material of vitreous character may be given considerable mechanical stresses in compression whereas such materials fail at comparatively low stresses in tension.

The stresses in insulator 4 and in shell 6 are of relative values depending on the moduli of elasticity of the materials and therefore on the nature thereof, and also depend on the relative values of the radial thicknesses of insulator 4 and shell 6 at the points of engagement therebetween. The absolute values of such stresses depend on the initial difference between the diameters of cylindrical portion 22 and surface 23. The best utilization of the material of the members is then obtained when the stresses in the two materials reach the permissible maximum value thereof without exceeding such value under any operating condition. Such stresses are, therefore, preferably caused to have values in a predetermined ratio, such ratio being the ratio of the maximum permissible values of stresses in the materials.

During operation of anode 1, such anode reaches a temperature which is generally materially higher than room temperature, and the joint between insulator 4 and shell 6 is subject to variations in temperature depending on the temperature of anode 1 and on the thermal conductivity and size of stem 3 and on the capacity of radiator 7 for dissipating such heat by convection. Such temperature variations are usually gradual so that cylindrical portions 6 and 22 may be assumed to retain equal temperatures throughout the variations. If cap 5 and insulator 4 are made of materials having the same coefficient of thermal expansion, the difference between the unstressed diameters of cylindrical portion 22 and 6 will remain constant at any temperature and the stresses in the material will therefore remain constant. If the coefficient of thermal expansion of cap 5 is lower than the coefficient of expansion of insulator 4 or is substantially equal to zero, the stresses in the members increase in direct relation with the increase of the temperature of the joint and the stresses at room temperature should therefore be made less than the maximum permissible stresses. If such condition is not complied with, upon increase of temperature of the joint, the stresses in shell 6 may exceed the elastic limit of the material thereof, causing the diameter of shell 6 to receive a permanent increase. When the joint is returned to a lower temperature shell 6 may reach the unstressed condition and cease to engage with insulator 4 in gas tight relation. The requirement relative to stressing of joints subjected to temperature lower than room temperature will readily be similarly formulated by one skilled in the art.

If the materials of insulator 4 and shell 6 are free from defects and if reasonable care is exercised in machining surfaces 22 and 23, the joint therebetween will remain gas tight within predetermined temperature limits. If such materials, however, have minor surface defects sufficient to cause failure of sealing action, the seal may still be maintained effective by means of a sealing fluid of a viscosity sufficiently high to withstand the pressure difference between the two sides of the joint tending to force such fluid from the interstices between surfaces 22 and 23. Such fluid is preferably placed as a coating on surface 22 before assembly of insulator 4 with cap 5 and then also acts as a lubricant facilitating the insertion of the insulator in the cap under pressure. Such sealing fluid preferably should not contain any volatile portions which would adversely affect the operation of the device and which would cause loosening of the joints upon evaporation or other loss of such volatile portions. The fluid should also preferably inherently tend to the plastic solid form and to simultaneously increase in volume to a slight extent. Such conditions are met by a non-volatile sealing medium consisting at least in part of tung oil containing an oxidizing agent causing such oil to reach the plastic solid form even in the absence of atmospheric oxygen.

Shell 6 may also be provided with a prolongation 24 extending in spaced relationship with respect to insulator 4 to form a substantially annular recess adjacent the portion of surfaces 22 and 23 in mutual engagement. This recess is provided for facilitating the introduction of insulator 4 in shell 6 and may also be utilized for retaining a body of plastic material cooperating with insulator 4 and shell 6 in mutually sealing such members. If such plastic material is a plastic solid it may be retained within the annular recess by adhesion therein. If such plastic material is a liquid at some or all operating temperatures of the joint, such as mercury or picein, such material may be retained in an annular member 26 surrounding the portion of insulator 4 and shell 6 forming the annular recess and being in liquid tight engagement with at least insulator 4.

The seal between insulator 4 and shell portion 8 of flange 9 is effected, in principle, in the same manner as the seal between insulator 4 and shell 6. The inner surface 27 of shell 8 is provided with an annular projection 29 against which insulator 4 is abutted whereby such projection receives the end thrust due to the atmospheric pressure on insulator 4 and relieves the engaging surfaces 27 of shell 8 and 28 of insulator 4 from the transmission of such thrust to flange 9. Insulator 4 is provided with an annular groove 31 intermediate the end portions of surface 28 and forming a recess for a body of plastic material 32 introduced therein when in the liquid state and which may be a liquid or a plastic solid at operating temperatures. The presence of such material may be indicated by a gauge 33 communicating with groove 31.

In seals such as the seal between insulator 4 and shell 6 the portion of insulator 4 bound by the portion of the surface 22 in engagement with surface 23 is stressed in compression to a degree which is substantially uniform in the axial direction of insulator 4. The portion of insulator 4 bound by the portion of surface 22 not in engagement with surface 23 is on the contrary entirely unstressed. The stresses in insulator 4 thus present an abrupt discontinuity resulting in the appearance of shearing stresses in a transverse plane containing the edge of shell 6. Such stresses may be considerably reduced by utilizing a portion of the insulator surfaces for the joints between insulator 4 and shell 8. In such joint surfaces 27 and 28 are coextensive except where groove 31 is provided, and the portions of insulator 4 adjacent the ends of surface 27 are of diameters materially smaller than the diameter of surfaces 28 and of gradually decreasing values. The compression stresses in the insulator then do not abruptly change from a material value to zero but gradually decrease in the material in the axial direction and the shearing stresses in the material may be reduced to any desired extent.

The joint between cylinder 14 and insulator 4 is effected in principle, in the same manner as the joints above considered. In general, cylinder 14 will reach operating temperatures considerably higher than the temperature of cylinders 6 and 8 and is preferably made of a material having the same coefficient of thermal expansion as insulator 4 to cause the stresses in the cylinder and in the insulator to remain substantially constant through a wide range of operating temperatures. Cylinder 14 is supported by engagement of a cylindrical inner surface 36 thereof with a cylindrical outer surface 34 of the insulator. Cylinder 14 has a radial thickness decreasing over a substantial portion of the length thereof to the end of the cylinder engaging with cylinder 4. As the stresses in insulator 4 depend on the relation between the radial thicknesses of the insulator and of the cylinder at the point of engagement therebetween, the compression stresses in insulator 4 gradually decrease from a maximum value obtained at the end of the insulator to a minimum value obtained at the end of the cylinder 14, which latter value may be substantially equal to zero. An abrupt change in the value of the stresses in insulator 4 at the end of cylinder 14 is thus avoided and excessive shearing stresses in the insulator are thereby prevented.

If the body of cylinder 14 is of such reduced thickness when compared to the length thereof that pressing the cylinder by application of force on the lower portion thereof may result in deformation thereof the cylinder may be provided with a flange 37 adjacent the upper end thereof on which the pressing force may be applied.

The seals between insulator 19 and cap 18 and flange 9 are shown as being effected without the assistance of a material volume of sealing medium. Such seals are of small diameter and are therefore comparatively easy to manufacture with a high degree of accuracy and to assemble correctly and do not justify the complication of the provision of a body of sealing medium and of means for retaining the latter. It will be understood, however, that a small amount of sealing medium may also be utilized advantageously in such joints for lubricating the members to be joined during assembly thereof and for closing any interstices between the members in contact and to fill up any minor defects in the materials.

Although but a few embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. A gas tight seal comprising a core member of material of vitreous character having a cylindrical outer surface of a certain diameter when in an unstressed condition, and a metallic shell member having a cylindrical inner surface of a diameter smaller than the diameter of said outer surface when in an unstressed condition, portions of said surfaces being in mutual engagement whereby said core member is partly maintained stressed in compression and said shell member is partly maintained stressed in tension.

2. A gas tight seal comprising a core member of material of vitreous character having a cylindrical outer surface of a certain diameter when in an unstressed condition, a metallic shell member having a cylindrical inner surface of a diameter smaller than the diameter of said outer surface when in an unstressed condition, portions of said surfaces being in mutual engagement whereby said core member is partly maintained stressed in compression and said shell member is partly maintained stressed in tension, and a sealing fluid for filling any interstices between said outer and inner surfaces.

3. A gas tight seal comprising a core member of material of vitreous character having a cylindrical outer surface of a certain diameter when in an unstressed condition, a metallic shell member having a cylindrical inner surface of a diameter smaller than the diameter of said outer surface when in an unstressed condition, portions of said surfaces being in mutual engagement whereby said core member is partly maintained stressed in compression and said shell member is partly maintained stressed in tension, and a non-volatile fluid for lubricating said surfaces during joining thereof and for cooperating in sealing said shell member against said core member.

4. A gas tight seal comprising a core member of material of vitreous character having a cylindrical outer surface of a certain diameter when in an unstressed condition, a metallic shell member having a cylindrical inner surface of a diameter smaller than the diameter of said outer surface when in an unstressed condition, portions of said surfaces being in mutual engagement whereby said core member is maintained stressed in compression and said shell member is maintained stressed in tension, and a non-volatile sealing material in fluid form applied between said surfaces of a composition and inherently tending to the plastic solid form and increasing in volume during such change of form.

5. A gas tight seal comprising a core member of material of vitreous character having a cylindrical outer surface formed to a certain diameter when in an unstressed condition, a metallic shell member having a cylindrical inner surface formed to a diameter smaller than the first said diameter when in an unstressed condition, portions of said surfaces being in mutual engagement whereby said core member is maintained stressed in compression and said shell member is maintained in tension, and a sealing medium applied between said surfaces and consisting of tung oil containing an oxidizing agent.

6. A gas tight seal comprising a core member of material of vitreous character having a cylindrical outer surface formed on certain diameter when in an unstressed condition, a metallic shell member having a cylindrical inner surface formed on diameter smaller than the first said diameter when in an unstressed condition, portions of said surfaces being in mutual engagement whereby said core member is maintained stressed in compression and said shell member is maintained stressed in tension, portions of each of said member extending axially in spaced relationship with respect to the other said member to form an annular recess adjacent the portions of said surfaces in mutual engagement, and a body of plastic material retained in said recess and cooperating in sealing said members.

7. A gas tight seal comprising a core member of material of vitreous character having a cylindrical outer surface of a certain diameter when in an unstressed condition, a metallic shell member having a cylindrical inner surface of a diameter smaller than the first said diameter when in an unstressed condition, portions of said surfaces being in mutual engagement whereby said core member is partly maintained stressed in compression and said shell member is partly maintained stressed in tension, portions of each of said members extending axially in spaced relationship with respect to the other said member to form a closed annular recess adjacent the portions of said surfaces in mutual engagement, and a body of plastic material retained in said recess and cooperating in sealing said members.

8. A gas tight seal comprising a core member of material of vitreous character having a cylindrical outer surface of a certain diameter when in an unstressed condition, a metallic shell member having a cylindrical inner surface of a diameter smaller than the first said diameter when in an unstressed condition, portions of said surfaces being in mutual engagement whereby said core member is partly maintained stressed in compression and said shell member is partly maintained stressed in tension, portions of each of said members extending axially in spaced relationship with respect to the other said member to form an open annular recess, an annular member surrounding said portions of said members and aiding in forming an annular recess and being in liquid tight engagement with at least one of said members, and a body of plastic material retained in said annular member to cooperate in sealing the first said members at the junction of said engaging surfaces with the surfaces forming said recess.

9. A gas tight seal comprising a core member of material of vitreous character having a cylindrical outer surface of a certain diameter when in an unstressed condition, and a metallic shell member having a cylindrical inner surface of a diameter smaller than the first said diameter when in an unstressed condition, the first said surface being in mutual engagement with at least a portion of the second said surface whereby said core member is partly maintained stressed in compression and said shell member is partly maintained stressed in tension, the portions of said core member having portions thereof adjacent the first said surface of a diameter materially smaller than the first said diameter and of gradually decreasing magnitude, whereby excessive shearing stresses are avoided in said core member.

10. A gas tight seal comprising a core member of material of vitreous character having a cylindrical outer surface of a certain diameter when in an unstressed condition, and a metallic shell member having a cylindrical inner surface of a diameter smaller than the first said diameter when in an unstressed condition, portions of said surfaces being in mutual engagement whereby said core member is partly maintained stressed in compression and said shell member is partly maintained stressed in tension, the portions of said members in mutual engagement being formed of such radial thicknesses as to cause the magnitudes of the stresses in said members to be maintained in predetermined ratio.

11. A gas tight seal comprising a core member of material of vitreous character having a cylindrical outer surface of a certain diameter when in an unstressed condition, and a metallic shell member having a cylindrical inner surface of a diameter small than the first said diameter when in an unstressed condition, portions of said surfaces being in mutual engagement whereby said core member is partly maintained stressed in compression and said shell member is partly maintained stressed in tension, the portions of said members in mutual engagement being formed of such radial thicknesses as to cause the magnitudes of the stresses in said members to be maintained in the same ratio as the maximum permissible stresses thereof.

12. A gas tight seal comprising a core member of material of vitreous character having a cylindrical outer surface adjacent an end thereof of a certain diameter when in an unstressed condition, and a metallic shell member having a cylindrical inner surface adjacent the end thereof of a diameter smaller than the first said diameter when in an unstressed condition, the first said surface being in mutual engagement with at least a portion of the second said surface whereby said core member is partly maintained stressed in compression and said shell member is partly maintained stressed in tension, the radial thickness of said shell member decreasing over a substantial portion of the length thereof to the said end thereof whereby excessive shearing stresses are avoided in said core member.

13. A gas tight seal subject to temperature variations and comprising a core member of material of vitreous character having a cylindrical outer surface of a certain diameter when in an unstressed condition, and a metallic shell member having a cylindrical inner surface of a diameter smaller than the first said diameter when in an unstressed condition, the materials of said members having substantially equal coefficients of thermal expansion, portions of said surfaces being in mutual engagement whereby said core member is partly maintained stressed in compression and said shell member is partly maintained stressed in tension to a substantially constant extent regardless of the temperature variations.

ARTHUR GAUDENZI.